US008565242B2

(12) United States Patent
Wu et al.

(10) Patent No.: US 8,565,242 B2
(45) Date of Patent: Oct. 22, 2013

(54) TRANSPORT PROTOCOL PERFORMANCE USING NETWORK BIT RATE INFORMATION

(75) Inventors: Wei Wu, Irving, TX (US); James E. Womack, Irving, TX (US); Bruno Richard Preiss, Waterloo (CA); Xinhua Ling, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 807 days.

(21) Appl. No.: 12/611,800

(22) Filed: Nov. 3, 2009

(65) Prior Publication Data

US 2010/0110989 A1     May 6, 2010

Related U.S. Application Data

(60) Provisional application No. 61/111,236, filed on Nov. 4, 2008.

(51) Int. Cl.
*H04W 28/20* (2009.01)

(52) U.S. Cl.
USPC ...... 370/395.41; 370/232; 370/252; 370/328; 370/468; 455/422.1; 709/233

(58) Field of Classification Search
USPC ............ 370/232–234, 252, 253, 310.2, 370/328–339, 349, 395.41, 412–418, 468; 455/422.1; 709/231–235
See application file for complete search history.

(56) References Cited

U.S. PATENT DOCUMENTS

| | | | |
|---|---|---|---|
| 6,460,085 B1 * | 10/2002 | Toporek et al. | 709/233 |
| 7,035,214 B1 * | 4/2006 | Seddigh et al. | 370/231 |
| 2002/0085587 A1 * | 7/2002 | Mascolo | 370/477 |
| 2002/0150048 A1 * | 10/2002 | Ha et al. | 370/231 |
| 2003/0149785 A1 * | 8/2003 | Gerla et al. | 709/232 |
| 2003/0231636 A1 * | 12/2003 | Berzosa et al. | 370/395.52 |
| 2005/0243718 A1 * | 11/2005 | Coupechoux et al. | 370/229 |
| 2006/0023663 A1 * | 2/2006 | Kim et al. | 370/329 |
| 2007/0115814 A1 * | 5/2007 | Gerla et al. | 370/230 |
| 2008/0132269 A1 * | 6/2008 | Shen et al. | 455/550.1 |
| 2009/0052384 A1 * | 2/2009 | Zisimopoulous et al. | 370/329 |
| 2010/0011270 A1 * | 1/2010 | Yamamoto et al. | 714/748 |
| 2010/0178941 A1 * | 7/2010 | Chun et al. | 455/458 |

OTHER PUBLICATIONS

Gerla et al., TCP Westwood with Adaptive Bandwidth Estimation to Improve Efficiency-Friendliness Tradeoffs, 2003, CiteSeerX, pp. 1-24.*

3GPP TS 24.008 v8.2.0; 3rd Generation Partnership Project; Technical Specification Group Core Network and Terminals; Mobile Radio Interface Layer 3 Specification; Core Network Protocols; Stage 3; Release 8; Jun. 2008; 553 pgs.

3GPP TS 23.401 v8.2.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Jun. 2008; 99 pgs. Part 1.

(Continued)

*Primary Examiner* — Hoon J Chung (74) *Attorney, Agent, or Firm* — Conley Rose, P.C.; J. Robert Brown, Jr.

(57) ABSTRACT

A method for communicating in a telecommunications system is provided. The method comprises conveying a downlink bit rate and an uplink bit rate associated with an access point name to a user agent.

36 Claims, 8 Drawing Sheets

(56) References Cited

OTHER PUBLICATIONS

3GPP TS 23.401 v8.2.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Jun. 2008; 83 pgs. Part 1.

Wang, R., et al.; Title: TCP Startup Performance in Large Bandwidth Delay Networks; IEEE INFOCOM; Mar. 2004; 10 pgs.

Allman, M., et al.; Title: TCP Congestion Control; Network Working Group; RFC 2581; Apr. 1999; 16 pgs.

Hoe, J.; Title: Improving the Start-up Behavior of a Congestion Control Scheme for TCP; ACM SIGCOMM; Aug. 1996; 11 pgs.

\* cited by examiner

TRANSPORT PROTOCOL PERFORMANCE USING NETWORK BIT RATE INFORMATION

CROSS-REFERENCE TO RELATED APPLICATIONS

The present application claims priority to U.S. provisional patent application No. 61/111,236, filed Nov. 4, 2008, by Wei Wu, et al, entitled "Transport Protocol Performance Using Network Bit Rate Information" (34446-US-PRV-4214-13000), which is incorporated by reference herein as if reproduced in its entirety.

BACKGROUND

As used herein, the terms "user agent" and "UA" can refer to mobile devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar wireless capabilities but that are not transportable, such as desktop computers, set-top boxes, or network nodes and therefore may also be referred to as user equipment "UE". When a UA is a network node, the network node could act on behalf of another function such as a wireless device and simulate or emulate the wireless device or fixed line device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station, an LTE ENB, or other such devices that can provide a UA with access to other components in a telecommunications system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A UA might connect to a packet-based network to gain access to services such as World Wide Web access, email, instant messaging services, and other data packet-based services. When a connection is established between the UA and the network, neither entity might be aware of the maximum number of data packets (or the equivalent data bytes) the network can send to the UA at any one time without packet loss.

Parameters such as congestion control window (cwnd) and slow start threshold (ssthresh) are used by the transport protocols. The cwnd and ssthresh can be in units of number of packets or equivalent number of bytes (depending on the transport protocol implementation). The parameter cwnd is the maximum number of packets that can be sent by the sender at any given time without waiting for receipt of an acknowledgement from the receiver. After an acknowledgement arrives at the sender, the cwnd may be changed to a new value depending on factors such as the current state of the transport protocol. Ideally, the cwnd should be adapted to a value that allows the data packets to be sent to the receiver as fast as possible provided that no packet loss is experienced due to congestion along the end-to-end path, including the receiver. The initial ssthresh is an initial estimate/guess of the ssthresh value. The cwnd is increased in a congestion avoidance stage in order to discover whether there is room to be a little more aggressive than the ssthresh allows. During the packet sending process, cwnd and ssthresh may be adaptively changed according to the packet loss and delay situation caused by the changing situation along the end-to-end path.

Traditionally, an inefficient trial-and-error approach has been used to determine the number of data packets the network sends to the UA at a given time. In an embodiment, a bit rate based on a parameter in the UA's service subscription profile is used to calculate this number. More specifically, a UA-related bit rate known as the Access Point Name-Aggregate Maximum Bit Rate (APN-AMBR) is used to configure the above mentioned network-related transport protocol parameters such as cwnd and initial ssthresh.

Figure 1:
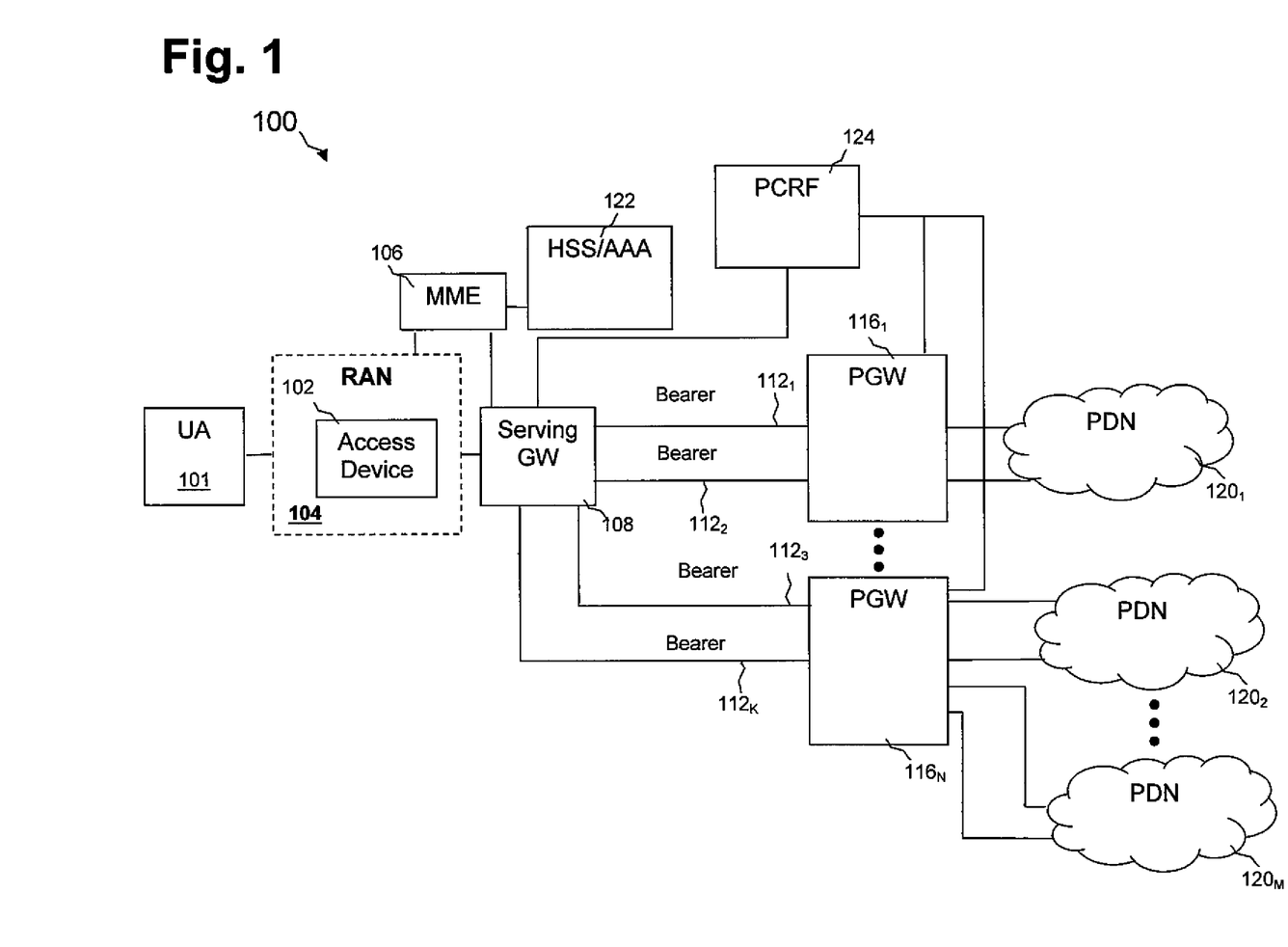
FIG. 1 is an illustration of a telecommunications system according to an embodiment of the disclosure.

A more thorough understanding of the APN-AMBR and the congestion window might be gained by a consideration of a typical packet-based wireless telecommunications system. FIG. 1 illustrates an embodiment of such a telecommunications system 100. FIG. 1 is exemplary and may have other components or arrangements in other embodiments. It should be noted that the lines connecting the elements in FIG. 1 can represent bearer connections, signaling connections, or both. Traditionally, a different style of line is used to represent each type of connection, but for the sake of clarity in the drawing, both bearer connections and signaling connections are represented by solid lines in FIG. 1.

In an embodiment, the system 100 might be or include an evolved packet system (EPS). The system 100 includes a RAN (radio access network) 104 that might use a Third Generation Partnership Project (3GPP) technology, an LTE technology, or some other technology. Internet protocols (IP) IPV4, IPV6, GPRS Tunneling Protocol (GTP), and/or other current or future protocols may be supported by these technologies. In addition, the RAN 104 may be serviced by any or a combination of Internet Protocol-based networks, packet-based networks, public-switched telecom networks, and/or integrated services digital networks.

The RAN 104 includes an access device 102, such as an ENB, a traditional base station, or a similar component. A UA 101 can communicate with the RAN 104. The RAN 104 can connect to a radio access cell by which the RAN 104 can provide services to the UA 101 via an air interface. The RAN 104 can communicate with an EPS mobility management entity (MME) 106 or a similar component that can terminate the control plane interface of the radio access portions of the system 100. The RAN 104 can also communicate with a serving gateway 108 or a similar component that can terminate the user plane interface of the radio access portions of the system 100. The serving gateway 108 can communicate through bearers $112_{1-K}$ or signaling connections to one or more packet data gateways (PGWs) $116_{1-N}$. Each of the PGWs $116_{1-N}$ is connected to one or more packet data networks (PDNs) $120_{1-M}$, which can provide access to packet-based services such as World Wide Web pages, email, instant messaging services, and other services. The PDNs 120 might be associated with access point names (APNs). For example, the APN "mobilemail.net" might represent a wireless email PDN.

A home subscriber server (HSS) 122, an authentication/authorization accounting (AAA) server, or a similar component can connect to the MME 106 (and other core network entities) and can store data related to services available to the UA 101, billing policies for the UA 101, and similar UA subscription profile data. If dynamic policy and charge control (PCC) rules are deployed in the system 100, a policy control and charging rules function (PCRF) 124, or a similar component, might be present. The PCRF 124 can connect to the serving gateway 108, the PDN gateways 116, and/or the PDNs 120, and can store policies related to the connections between the access device 102 and the PDN gateways 116.

Bearer traffic (represented by the bearers $112_{1-K}$ and other connections on the paths between the UA 101 and the PDNs 120) can be classified into two categories: Guaranteed Bit Rate (GBR) and non-Guaranteed Bit Rate (non-GBR). On a GBR bearer, a specified bandwidth is reserved and remains available as long as the bearer remains in place. A GBR bearer might be established for services with strict bandwidth requirements, such as streaming video. Services such as email that have more flexible bandwidth requirements might use non-GBR bearers, for which a specified bandwidth is not reserved.

For non-GBR bearers, an Aggregate Maximum Bit Rate (AMBR) might be defined, which can be considered a total bandwidth available to be shared among all the non-GBR bearers between the UA 101 and the PDNs 120. The AMBR for the UA 101 is a quality of service parameter based on the UA's service subscription and is typically stored in a UA profile in the HSS 122. When the UA 101 attaches to one or more of the PDNs 120, the MME 106 can retrieve the UA's AMBRs from the HSS 122 and use them to control the flow of data between the UA 101 and the PDNs 120. Since the PDNs 120 are typically associated with Access Point Names, the AMBR can also be referred to as the APN-AMBR. It should be noted that the downlink (DL) APN-AMBR could be same as or different from the uplink (UL) APN-AMBR. The UA 101 may store the DL APN-AMBR and the UL APN-AMBR as part of the UA's context information after the DL APN-AMBR and the UL APN-AMBR are received from the MME 106.

Figure 2:
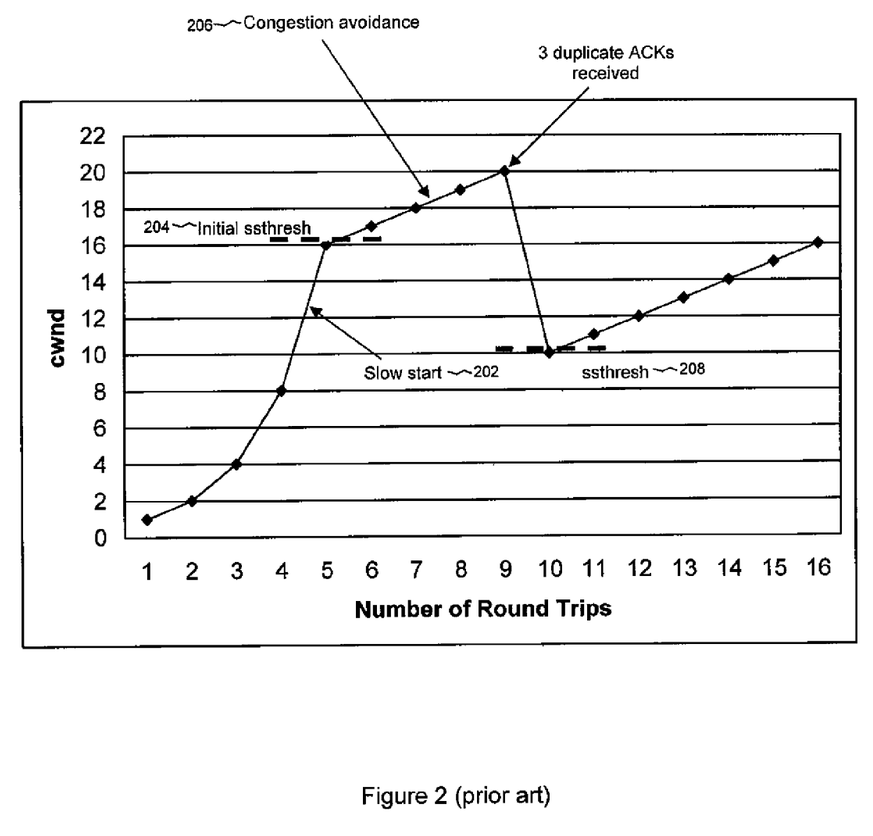
FIG. 2 is a graph of a congestion control scheme according to the prior art.

As mentioned previously, when the UA 101 connects to one of the PDNs 120, the PDN 120 might not know how many data packets it can send to the UA 101 at any one time. Transport protocols have been developed that rely on congestion control schemes to probe network conditions and determine the number of packets (or equivalent number of bytes) that can be sent any given time. Parameters such as congestion control window and slow start threshold are used by the transport protocols for congestion control. FIG. 2 illustrates one such scheme that the PDN 120 could use to determine how many data packets to send to the UA 101. The x-axis of the graph represents instances of the PDN 120 sending one or more data packets to the UA 101. These instances could also be referred to as round trips of data being sent to the UA 101 and the UA 101 returning an acknowledgement of the receipt of the data. The y-axis represents the number of data packets the PDN 120 sends at each of the instances. This number can be referred to as the congestion window (cwnd) size.

This congestion control scheme begins with a slow start phase 202 in which the congestion window size is doubled until an initial slow start threshold (ssthresh) 204 is reached. That is, the first time the PDN 120 sends data to the UA 101, the PDN 120 sends one data packet. If the UA 101 sends the PDN 120 an acknowledgement indicating that the UA 101 received the data packet, the PDN 120 then sends the UA 101 two data packets. If the UA 101 successfully receives the two data packets, the PDN 120 then sends the UA 101 four data packets. This doubling pattern continues until the initial slow start threshold 204, an arbitrarily set default value, is reached. In the example of FIG. 2, the initial slow start threshold 204 is 16.

When the initial slow start threshold 204 is reached, a congestion avoidance phase 206 begins, in which the congestion window size increases by one each time the PDN 120 sends data to the UA 101. That is, if the UA 101 sends the PDN 120 an acknowledgement that the UA 101 successfully received the 16 data packets sent in the fifth round trip, the PDN 120 will increase the congestion window size to 17 for the sixth round trip. If the UA 101 continues to successfully receive the data packets, the PDN 120 will continue to add one to the congestion window size on each successive round trip.

Eventually, the congestion window size will be increased to the point where the UA 101 cannot handle all of the data packets sent to it, and one or more data packets will be dropped. The UA 101 will then send the PDN 120 a message indicating that one or more data packets were not successfully received. When the PDN 120 receives three such duplicate messages, the PDN 120 interprets this as a signal of network congestion and knows that the congestion window size is too large. The PDN 120 then decreases the congestion window size to another threshold 208. In the example of FIG. 2, the point where the congestion window size becomes too large occurs at a congestion window size of 20, and the PDN 120 then decreases the congestion window size by half to 10. Another congestion avoidance phase then begins, in which the congestion window size is again increased by one with each round trip. This pattern of increasing and decreasing the congestion window size might continue indefinitely.

When a connection is established between the UA 101 and the PDN 120, the PDN 120 typically uses an arbitrary default value for the initial slow start threshold 204. If the initial slow start threshold 204 is set too high, the exponential increase of the congestion window size can continue for too long, and the PDN 120 might send the UA 101 far more data packets than the UA 101 or the network can handle. This may cause multiple packet losses and coarse-grained timeouts, resulting in significant throughput reduction. If the initial slow start threshold 204 is set too low, the change from the slow start phase 202 to the congestion avoidance phase 206 occurs prematurely. This can result in poor start-up bandwidth utilization since multiple round trips would occur in which the UA 101 receives fewer data packets than it can handle or the network can deliver.

The initial slow start threshold 204 could be set to a value equal to the product of a network delay time and an estimated bandwidth. It has been shown that the value of the initial slow start threshold 204 chosen using this estimate is no worse than, and is frequently better than, the arbitrary initial value. The network delay time can be easily estimated by the PDN 120 based on a round trip time measurement. However, it may be difficult to obtain an accurate estimation of available bandwidth.

In the EPS, the non-GBR data rate from the PDN 120 to the UA 101 is capped by the downlink (DL) APN-AMBR. In an embodiment, the DL APN-AMBR is used as the definitive upper bound of the available bandwidth for the UA 101. Then, instead of an arbitrary value being set for the initial slow start threshold 204, the initial slow start threshold 204 during the slow start phase 202 can be set as:

$$\text{initial ssthresh} = (\text{DL APN-AMBR} \times \text{RTT}) / (\alpha \times \text{average packet size}). \quad (1)$$

RTT is the round trip time measured by the PDN 120 and is measured from the time the PDN 120 sends a packet until the time the PDN 120 receives an acknowledgement message for that packet, assuming that an acknowledgement message is generated by the UA 101 for each packet received. $\alpha$ is a positive multiplier used in engineering practice to adjust the constant value of the average packet size upward or downward.

In addition, in an embodiment, the congestion window size during the congestion avoidance phase can be bounded as follows:

$$\text{cwnd} \leq (\text{DL APN-AMBR} \times \text{RTT}) / (\alpha \times \text{average packet size}). \quad (2)$$

Figure 3:
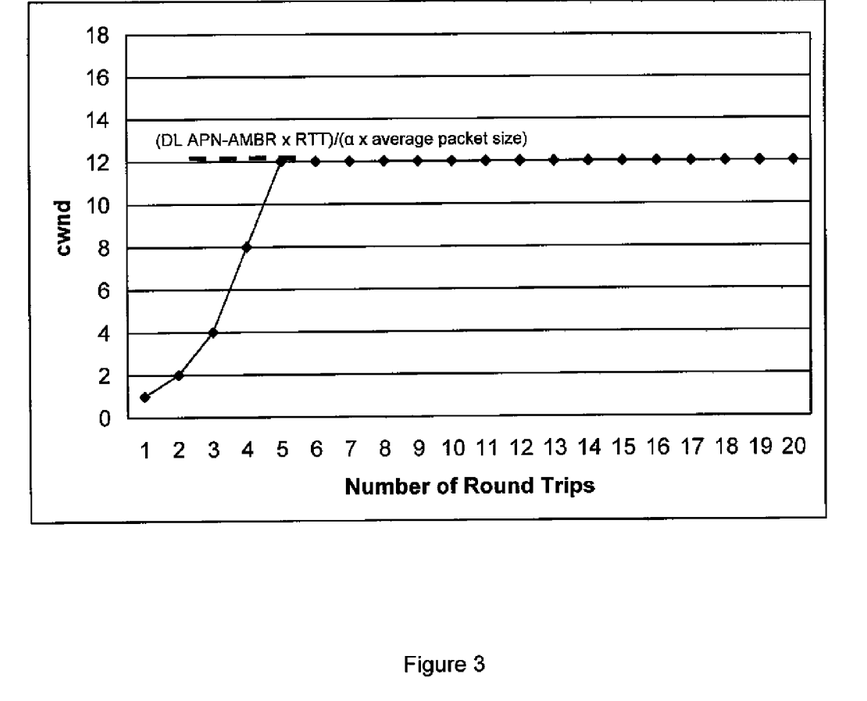
FIG. 3 is a graph of a congestion control scheme according to an embodiment of the disclosure.

FIG. 3 illustrates the congestion window size when equations (1) and (2) are implemented. In this graph, it is assumed that RTT is a constant and that (DL APN-AMBR×RTT)/($\alpha \times$ average packet size) is equal to 12 segments. If RTT varies, existing techniques might be used to estimate an average RTT. It is also assumed that packet loss or delay is due only to the sending rate exceeding the APN-AMBR, rather than network congestion or radio link errors. However, it should be noted that with APN-AMBR information, network congestion or radio link errors caused packet loss or delay could still happen. For example, during the slow start phase 202, the PDN 120 could become congested, and packets could be dropped before the congestion window size reaches the initial slow start threshold 204 as defined by equation (1). As mentioned earlier, the APN-AMBR defines only the allowed maximum non-GBR data rate from the PDN 120 to the UA 101. This maximum data rate is not guaranteed, but depends on the traffic conditions of the PDN 120.

As shown in FIG. 3, the DL APN-AMBR information can help the PDN 120 determine the initial slow start threshold 204 in the slow start phase 202 as well as a possible maximum congestion window size in the congestion avoidance phase 206. This can keep the congestion window size relatively constant, in contrast with the large changes in the congestion window size shown in FIG. 2. As a result, packet loss or delay due to a congestion window size that is too large can be avoided, and network bandwidth under-utilization due to a congestion window size that is too small can also be avoided.

The DL APN-AMBR in equations (1) and (2) is a UA-related parameter that is used to configure a network-related parameter in the PDN 120. Methods by which the UA 101 can provide the DL APN-AMBR to the PDN 120 are discussed below. Before the DL APN-AMBR is provided to the PDN 120, the DL APN-AMBR might be provided to the UA 101 in one of several EPS procedures. For example, the DL APN-AMBR might be provided to the UA 101 during an E-UTRAN (Evolved UMTS (Universal Mobile Telecommunications System) Terrestrial Radio Access Network) initial attachment, during a PDN gateway-initiated bearer modification with a bearer quality of service (QoS) update, during a PDN gateway-initiated bearer modification without a bearer QoS update, during UA-requested PDN connectivity, or during an HSS-initiated subscribed QoS modification.

For example, the "PDN gateway-initiated bearer modification without a bearer QoS update" procedure might be triggered by one of the PDN gateways 116 when the UA's APN-AMBR is modified. The PDN gateway 116 may then send an Update Bearer Request message including the modified APN-AMBR to the MME 106 through the serving gateway 108. The MME 106 might then build a Session Management Request message including the received APN-AMBR information. The MME 106 may then send a downlink non-access stratum (NAS) Transport (Session Management Configuration) message to the access device 102. The access device 102 might then send a Direct Transfer (Session Management Request) message to the UA 101. The UA 101 might then extract the APN-AMBR information from the Session Management Request information element.

The APN-AMBR can be provided to the UA 101 in any of the above procedures, but it is not clear whether DL APN-AMBR information, which defines the maximum non-GBR data rate from the PDN 120 to the UA 101, will be conveyed, or whether only UL APN-AMBR information, which defines the maximum non-GBR data rate from the UA 101 to the PDN 120 and which may be different from the DL APN-AMBR, will be conveyed. In an embodiment, both the DL APN-AMBR and the UL APN-AMBR are conveyed to the UA 101 in the above listed EPS procedures.

Once the UA 101 has the DL APN-AMBR information, the UA 101 can convey information related to the DL APN-AMBR to the PDN 120. The DL APN-AMBR-related information might be the DL APN-AMBR itself or might be a value calculated using the DL APN-AMBR. The PDN 120 can use that information to configure its transport protocol parameters so that downlink traffic will not exceed the allowed data rate. Methods of conveying the DL APN-AMBR-related information to the PDN's transport layer depend on the transport protocols used by the PDN 120. The following examples of methods of conveying the DL APN-AMBR information assume that the transmission control protocol (TCP) is used as the transport protocol. However, these methods may be applicable to other transport protocols with congestion control mechanisms similar to those of TCP.

In one example, the UA 101 can convey the DL APN-AMBR to the PDN 120 using a standard or proprietary application layer protocol. That is, the UA 101 sends the DL APN-AMBR to the PDN's application layer, which is above the transport layer in a typical protocol stack. The PDN 120 then extracts the DL APN-AMBR information from the application layer message and calculates the initial slow start threshold and the maximum congestion window size using equations (1) and (2).

Figure 4:
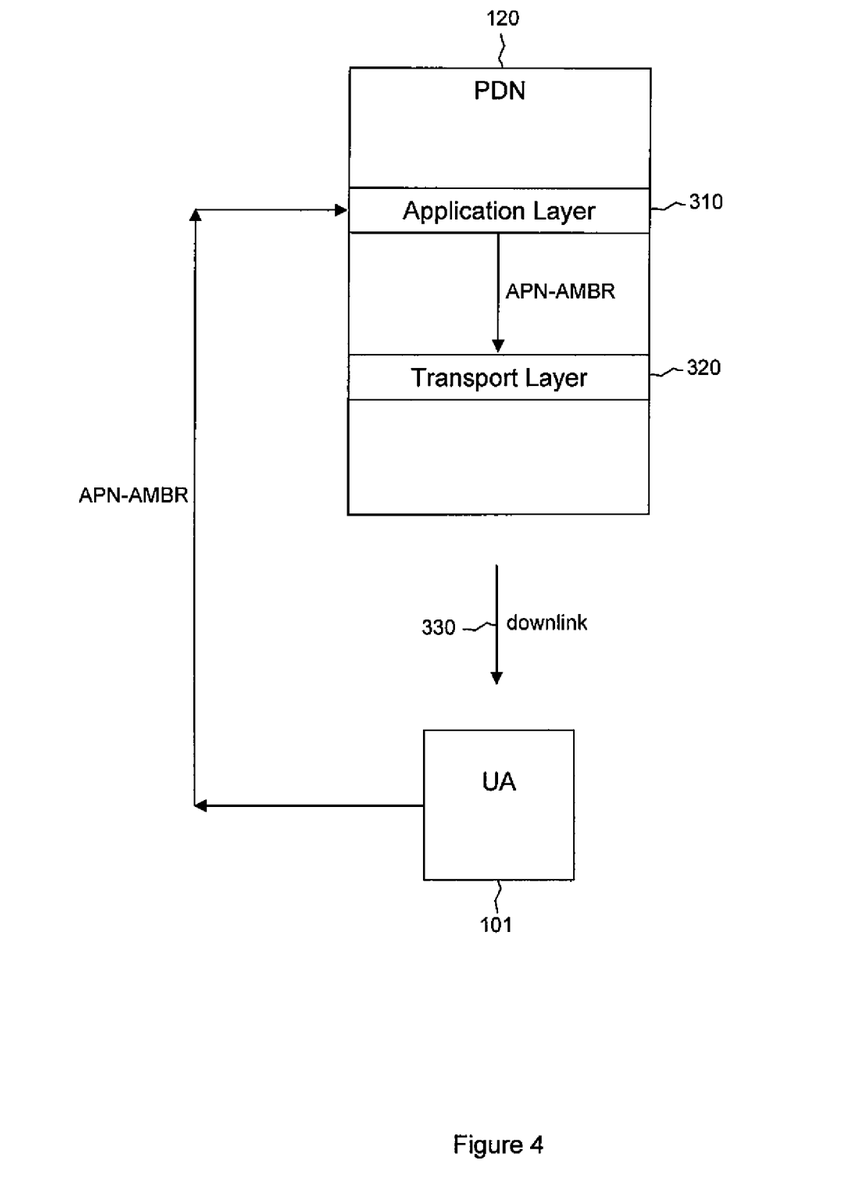
FIG. 4 is a diagram of a method for sending a user agent-related parameter to a network according to an embodiment of the disclosure.

FIG. 4 illustrates this method. The UA 101 sends the APN-AMBR to the application layer 310 of the PDN 120. The application layer 310 then sends the APN-AMBR to the PDN's transport layer 320. The transport layer 320 then calculates the slow start threshold and the congestion window size using equations (1) and (2). The PDN 120 then sends data on a downlink 330 to the UA 101 using the calculated slow start threshold and the congestion window size as transport parameters.

In another example, the UA 101 may communicate directly with the PDN's transport layer. For instance, the UA's receiver window (rwnd) size is the maximum number of data packets that the UA 101 can receive at any one time, and protocols exist for the UA 101 to send this value to the PDN's transport layer. In an embodiment, the receiver window size can be calculated using the DL APN-AMBR as follows:

$$rwnd = (DL\ APN\text{-}AMBR \times RTT)/(\alpha \times average\ packet\ size). \quad (3)$$

In this case, RTT is measured by the UA 101 instead of by the PDN 120. After calculating the receiver window size, the UA 101 sends that information to the PDN's transport layer. The PDN 120 then uses the receiver window size to calculate its initial slow start threshold and congestion window size as follows:

$$initial\ ssthresh = rwnd \quad (4)$$

and $$cwnd \leq rwnd. \quad (5)$$

Figure 5:
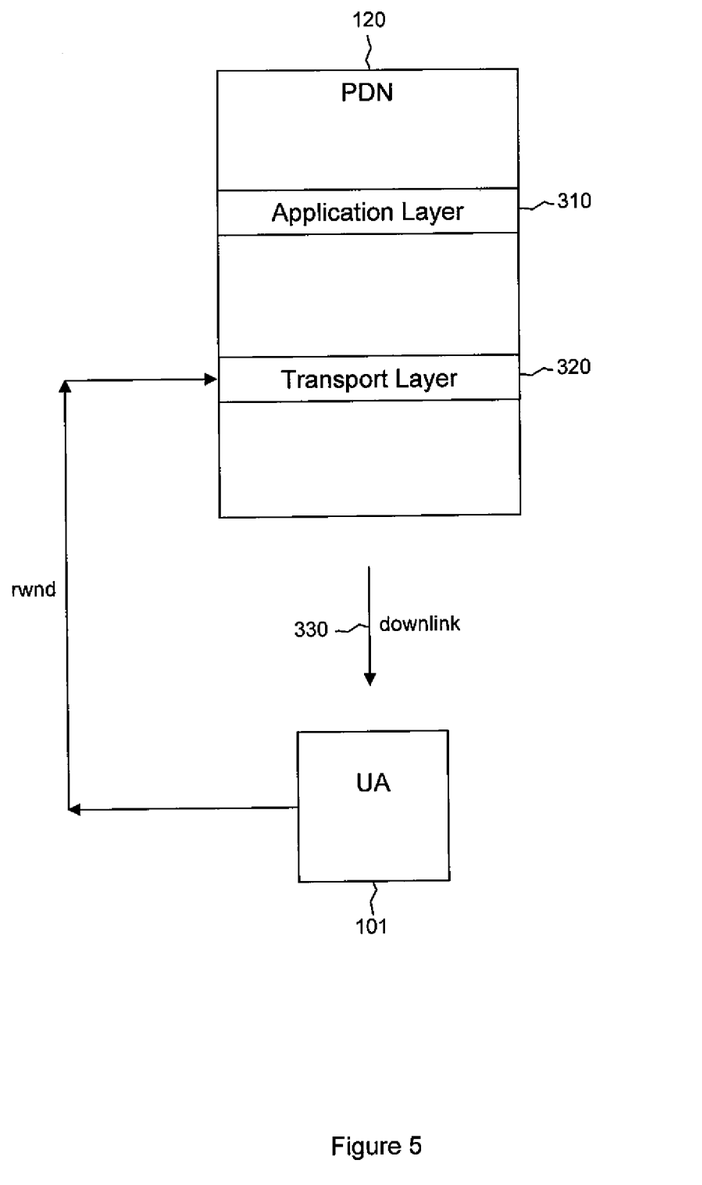
FIG. 5 is a diagram of a method for sending a user agent-related parameter to a network according to an alternative embodiment of the disclosure.

FIG. 5 illustrates this method. The UA 101 calculates the receiver window size using the DL APN-AMBR. The UA 101 then sends the receiver window size to the transport layer 320 of the PDN 120. The PDN 120 calculates the slow start threshold and the congestion window size using equations (4) and (5). The PDN 120 then sends data on a downlink 330 to the UA 101 using the calculated slow start threshold and the congestion window size as transport parameters.

The PDN 120 can use the DL APN-AMBR-related information received from the UA 101 for setting its transport parameters. In addition to the DL APN-AMBR-related information, the UL APN-AMBR can also be conveyed from the UA 101 to the PDN 120. As previously mentioned, the UL APN-AMBR could be different from the DL APN-AMBR. In some cases, the PDN 120 might use the UL APN-AMBR to dimension the receiving buffer size for the uplink data packets from the UA 101. The UL APN-AMBR information might also be used to provide the PDN 120 with bit rate information for the UA 101 in both transport directions. It is up to the PDN 120 how to utilize the UL APN-AMBR information.

Figure 6:
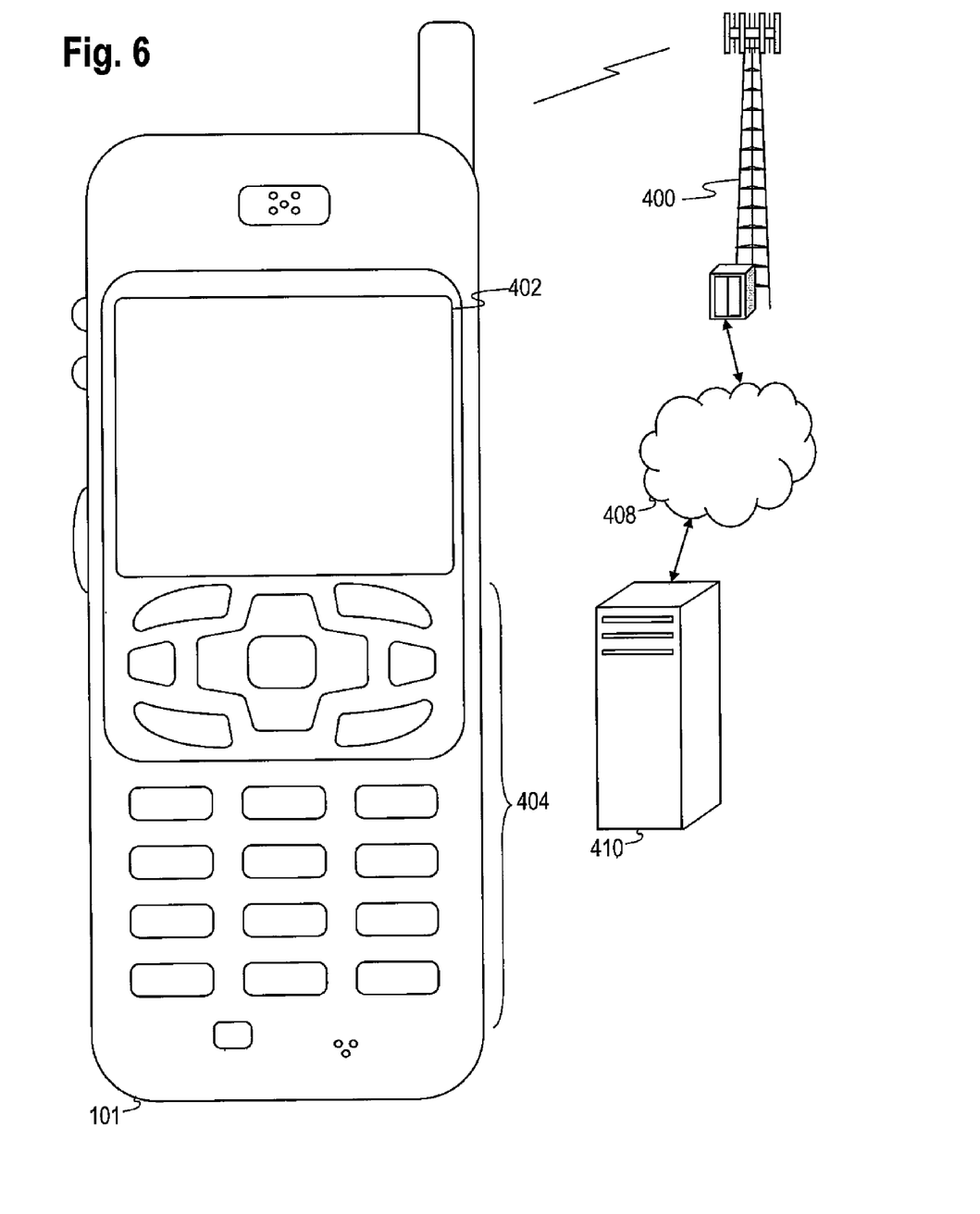
FIG. 6 is a diagram of a wireless communications system including a user agent operable for some of the various embodiments of the disclosure.

FIG. 6 illustrates a wireless communications system including an embodiment of the UA 101. The UA 101 is operable for implementing aspects of the disclosure, but the disclosure should not be limited to these implementations. Though illustrated as a mobile phone, the UA 101 may take various forms including a wireless handset, a pager, a personal digital assistant (PDA), a portable computer, a tablet computer, or a laptop computer. Many suitable devices combine some or all of these functions. In some embodiments of the disclosure, the UA 101 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 101 may be a portable, laptop or other computing device. The UA 101 may support specialized activities such as gaming, inventory control, job control, and/or task management functions, and so on.

The UA 101 includes a display 402. The UA 101 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 101 may present options for the user to select, controls for the user to actuate, and/or cursors or other indicators for the user to direct.

The UA 101 may further accept data entry from the user, including numbers to dial or various parameter values for configuring the operation of the UA 101. The UA 101 may further execute one or more software or firmware applications in response to user commands. These applications may configure the UA 101 to perform various customized functions in response to user interaction. Additionally, the UA 101 may be programmed and/or configured over-the-air, for example from a wireless base station, a wireless access point, or a peer UA 101.

Among the various applications executable by the UA 101 are a web browser, which enables the display 402 to show a web page. The web page may be obtained via wireless communications with a wireless network access node, a cell tower, a peer UA 101, or any other wireless communication network or system 400. The network 400 is coupled to a wired network 408, such as the Internet. Via the wireless link and the wired network, the UA 101 has access to information on various servers, such as a server 410. The server 410 may provide content that may be shown on the display 402. Alternately, the UA 101 may access the network 400 through a peer UA 101 acting as an intermediary, in a relay type or hop type of connection.

Figure 7:
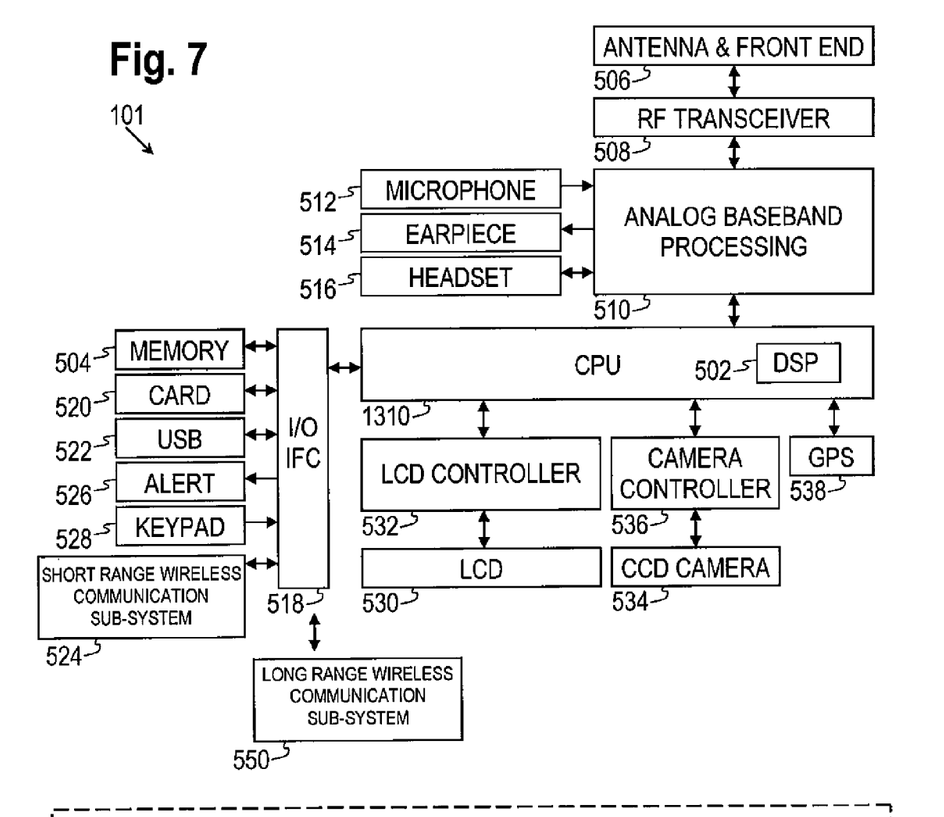
FIG. 7 is a block diagram of a user agent operable for some of the various embodiments of the disclosure.

FIG. 7 shows a block diagram of the UA 101. While a variety of known components of UAs 101 are depicted, in an embodiment a subset of the listed components and/or additional components not listed may be included in the UA 101. The UA 101 includes a memory 504 and a central processing unit (CPU) 1310 that may incorporate a digital signal processor (DSP) 502. As shown, the UA 101 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 101 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 101 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 101 to send and receive information from a cellular network or some other available wireless communications network or from a peer UA 101. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 101 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive email or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 101 and may also enable the UA 101 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 101 to communicate wirelessly with other nearby mobile devices and/or wireless base stations. A long range wireless communication sub-system 550 may also be present and may be compliant with IEEE 802.16.

The input/output interface 518 may further connect the DSP 502 to the alert 526 that, when triggered, causes the UA 101 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 101. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 101 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 101 to determine its position. Various other peripherals may also be included to provide additional functions, e.g., radio and television reception.

Figure 8:
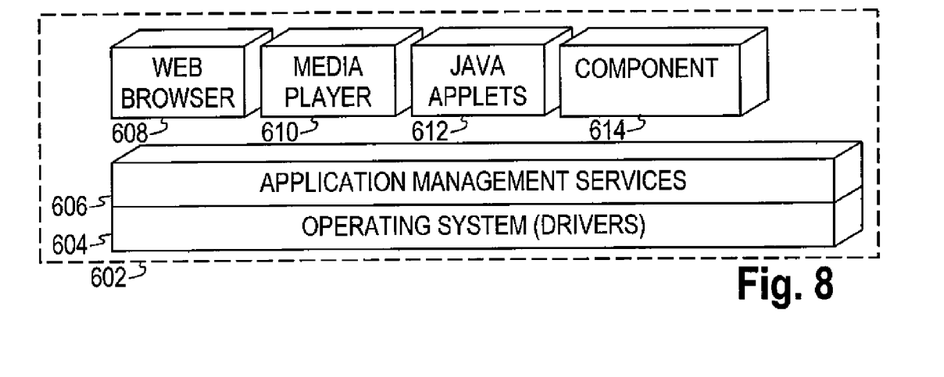
FIG. 8 is a diagram of a software environment that may be implemented on a user agent operable for some of the various embodiments of the disclosure.

FIG. 8 illustrates a software environment 602 that may be implemented by the DSP 502. Alternatively, the software environment 602 can be executed in an execution environment hosted by the central processing unit (CPU) 1310 on the UA 101 or by a logical CPU with a combined DSP function. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the UA 101, monitor applications, preempt applications, and perform other functions of an underlying operating system platform such as controlling, monitoring, and sometimes preempting or terminating logical processes, including execution threads.

Also shown in FIG. 8 are a web browser application 608, a media player application 610, and Java applets 612. The web browser application 608 configures the UA 101 to operate as a web browser, allowing a user to enter information into forms and select links to retrieve and view web pages. The media player application 610 configures the UA 101 to retrieve and play audio or audiovisual media. The Java applets 612 configure the UA 101 to provide games, utilities, and other functionality. The AMS 606 may also host a Java Virtual Machine on which the Java applets 612 can execute. Other execution environments could also be hosted, such as a C runtime environment to support executable programs and applications written in the C programming language. A component 614 might provide functionality related to transport protocol performance.

Figure 9:
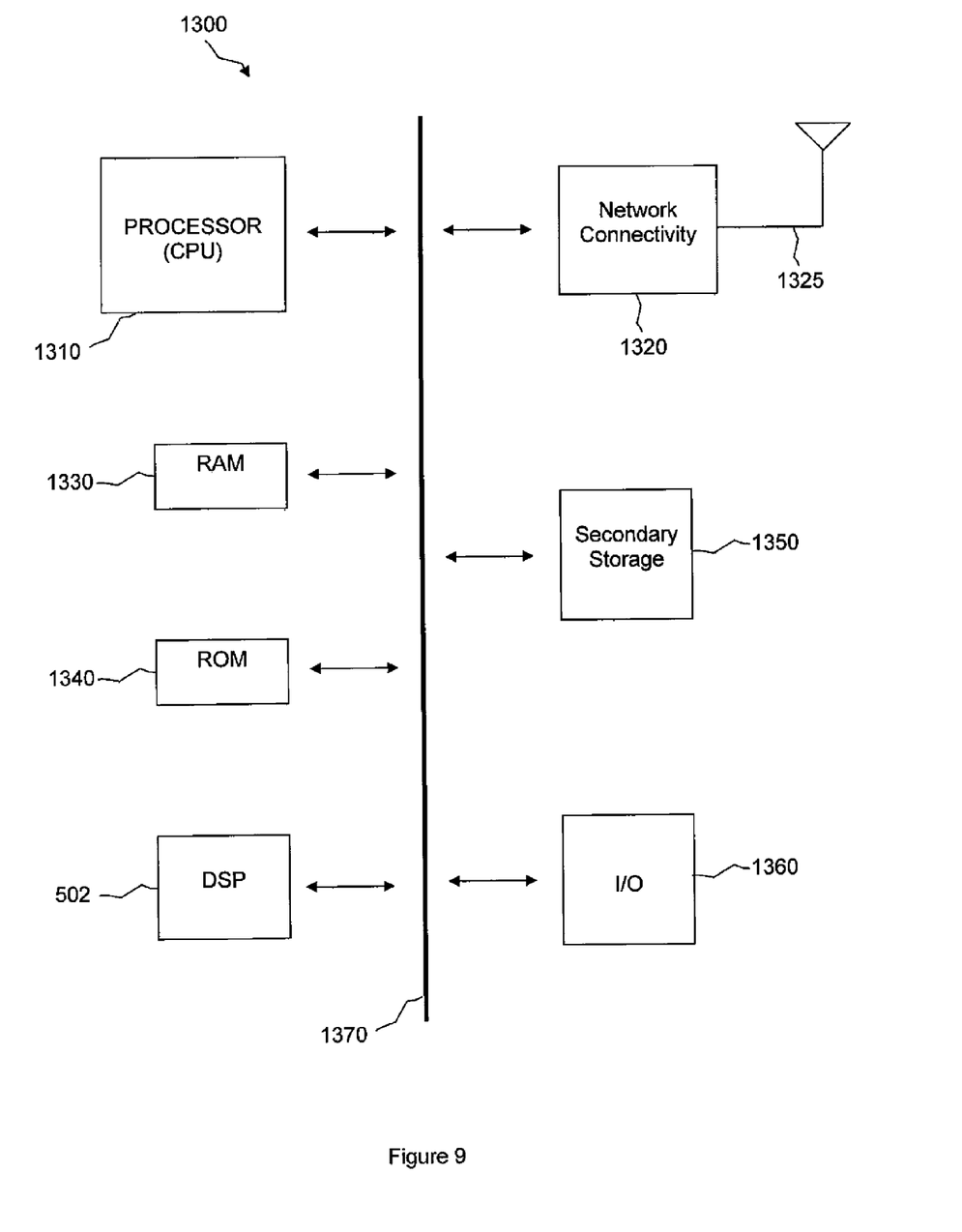
FIG. 9 illustrates a processor and related components suitable for implementing the several embodiments of the present disclosure.

The UA 101 and other components described above might include a processing component that is capable of executing instructions related to the actions described above. FIG. 9 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as the DSP 502 described above. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 101, such as the display 402 and the input 404.

The following 3rd Generation Partnership Project (3GPP) Technical Specifications (TS) are incorporated herein by reference: TS 23.401 and TS 24.008.

In an embodiment, a method for communicating in a telecommunications system is provided. The method comprises conveying a downlink bit rate and an uplink bit rate associated with an access point name to a user agent.

In an alternative embodiment, a system is provided. The system comprises a network component configured to convey a downlink bit rate and an uplink bit rate associated with an access point name to a user agent.

In an alternative embodiment, a user agent is provided. The user agent comprises a processor configured to receive a downlink bit rate and an uplink bit rate associated with an access point name from a network component.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communicating in a telecommunications system, comprising:
    a user agent receiving a downlink access point name aggregated maximum bit rate (DL APN-AMBR) and an uplink access point name aggregated maximum bit rate (UL APN-AMBR) associated with an access point name; and
    the user agent maintaining information related to at least one of the DL APN-AMBR and UL APN-AMBR associated with the access point name as part of the user agent's context information.

2. The method of claim 1, further comprising:
    the user agent providing additional information related to at least one of the DL APN-AMBR and UL APN-AMBR associated with the access point name to a packet data network in the telecommunications system.

3. The method of claim 2, wherein the additional information related to the DL APN-AMBR associated with the access point name comprises one of: the DL APN-AMBR, or a receiver window size calculated using the DL APN-AMBR; and
    wherein the additional information related to the UL APN-AMBR associated with the access point name comprises the UL APN-AMBR.

4. The method of claim 3, further comprising, when the additional information related to the DL APN-AMBR associated with the access point name is the DL APN-AMBR:
    the user agent providing the DL APN-AMBR to a layer in the packet data network above a transport layer in the packet data network.

5. The method of claim 4, further comprising:
    the packet data network using the additional information related to at least one of the DL APN-AMBR and UL APN-AMBR associated with the access point name to determine at least one transport protocol parameter.

6. The method of claim 5, further comprising, when the additional information related to the DL APN-AMBR associated with the access point name is the DL APN-AMBR:
    the layer above the transport layer providing the DL APN-AMBR to the transport layer; and
    the transport layer using the DL APN-AMBR to calculate the at least one transport protocol parameter.

7. The method of claim 6, wherein the layer above the transport layer is an application layer.

8. The method of claim 6, wherein the at least one transport protocol parameter is at least one of:
    an initial slow start threshold determined by calculating a product of the DL APN-AMBR and a round trip time of a packet sent from the packet data network to the user agent, dividing the product by a scaled value of an average packet size, and setting the initial slow start threshold equal to the result of the division; and
    a congestion window size determined by calculating the product of the DL APN-AMBR and the round trip time of the packet sent from the packet data network to the user agent, dividing the product by a scaled value of the average packet size, and setting the congestion window size less than or equal to the result of the division.

9. The method of claim 3, further comprising:
    the user agent providing the UL APN-AMBR to a layer in the packet data network above a transport layer in the packet data network.

10. The method of claim 9, further comprising:
    the packet data network using the additional information related to at least one of the DL APN-AMBR and UL APN-AMBR associated with the access point name to determine at least one transport protocol parameter;
    the layer above the transport layer providing the DL APN-AMBR to the transport layer; and
    the transport layer using the DL APN-AMBR to calculate the at least one transport protocol parameter.

11. The method of claim 3, further comprising, when the additional information related to the DL APN-AMBR associated with the access point name is the receiver window size calculated using the DL APN-AMBR:
    the user agent determining the receiver window size by calculating a product of the DL APN-AMBR and a round trip time of a packet sent from the packet data network to the user agent, dividing the product by a scaled value of an average packet size, and setting the receiver window size equal to the result of the division; and the user agent providing the receiver window size to a transport layer in the packet data network.

12. The method of claim 9, further comprising:

the packet data network using the additional information related to at least one of the DL APN-AMBR and UL APN-AMBR associated with the access point name to determine at least one transport protocol parameter.

13. The method of claim 12, further comprising, when the additional information related to the DL APN-AMBR associated with the access point name is the receiver window size calculated using the DL APN-AMBR:

the transport layer using the receiver window size to calculate the at least one transport protocol parameter.

14. The method of claim 13, wherein the at least one transport protocol parameter is at least one of:

an initial slow start threshold calculated by setting the initial slow start threshold equal to the receiver window size; and a congestion window size calculated by setting the congestion window size less than or equal to the receiver window size.

15. The method of claim 2, further comprising:

the packet data network using the additional information related to at least one of the DL APN-AMBR and UL APN-AMBR associated with the access point name to determine at least one transport protocol parameter.

16. The method of claim 1, wherein the DL APN-AMBR and UL APN-AMBR associated with the access point name are conveyed to the user agent upon at least one of:

an E-UTRAN (Evolved UMTS (Universal Mobile Telecommunications System) Terrestrial Radio Access Network) initial attachment;

a packet data network gateway-initiated bearer modification with a bearer quality of service (QoS) update;

a packet data network gateway-initiated bearer modification without a bearer QoS update;

a user agent-requested packet data network connectivity; and a home subscriber server-initiated subscribed QoS modification.

17. A system, comprising:

a user agent configured to receive a downlink access point name aggregated maximum bit rate (DL APN-AMBR) and an uplink access point name aggregated maximum bit rate (UL APN-AMBR) associated with an access point name, wherein the user agent maintains information related to at least one of the DL APN-AMBR and UL APN-AMBR associated with the access point name as part of the user agent's context information.

18. The system of claim 17, wherein the user agent provides additional information related to at least one of the DL APN-AMBR and UL APN-AMBR associated with the access point name to a packet data network in the system.

19. The system of claim 18, wherein the packet data network is configured to use the additional information related to at least one of the DL APN-AMBR and UL APN-AMBR associated with the access point name to determine at least one transport protocol parameter;

wherein the additional information related to the DL APN-AMBR associated with the access point name comprises one of: the DL APN-AMBR, or a receiver window size calculated using the DL APN-AMBR; and wherein the additional information related to the UL APN-AMBR associated with the access point name comprises the UL APN-AMBR.

20. The system of claim 19, wherein, when the additional information related to the DL APN-AMBR associated with the access point name is the DL APN-AMBR, the user agent provides the DL APN-AMBR to a layer in the packet data network above a transport layer in the packet data network, the layer above the transport layer provides the DL APN-AMBR to the transport layer, and the transport layer uses the DL APN-AMBR to calculate the at least one transport protocol parameter.

21. The system of claim 20, wherein the layer above the transport layer is an application layer.

22. The system of claim 20, wherein the at least one transport protocol parameter is at least one of:

an initial slow start threshold determined by calculating a product of the DL APN-AMBR and a round trip time of a packet sent from the packet data network to the user agent, dividing the product by a scaled value of an average packet size, and setting the initial slow start threshold equal to the result of the division; and a congestion window size determined by calculating the product of the DL APN-AMBR and the round trip time of the packet sent from the packet data network to the user agent, dividing the product by a scaled value of the average packet size, and setting the congestion window size less than or equal to the result of the division.

23. The system of claim 19, wherein the user agent provides the UL APN-AMBR to a layer in the packet data network above a transport layer in the packet data network, the layer above the transport layer provides the UL APN-AMBR to the transport layer, and the transport layer uses the UL APN-AMBR to calculate the at least one transport protocol parameter.

24. The system of claim 19, wherein, when the additional information related to the DL APN-AMBR associated with the access point name is the receiver window size determined using the DL APN-AMBR, the user agent calculates the receiver window size by calculating a product of the DL APN-AMBR and a round trip time of a packet sent from the packet data network to the user agent, dividing the product by a scaled value of an average packet size, and setting the receiver window size equal to the result of the division, and wherein the user agent provides the receiver window size to a transport layer in the packet data network, and wherein the transport layer uses the receiver window size to calculate the at least one transport protocol parameter.

25. The system of claim 24, wherein the at least one transport protocol parameter is at least one of:

an initial slow start threshold determined by setting the initial slow start threshold equal to the receiver window size; and a congestion window size calculated by setting the congestion window size less than or equal to the receiver window size.

26. The system of claim 17, wherein the DL APN-AMBR and UL APN-AMBR associated with the access point name are conveyed to the user agent upon at least one of:

an E-UTRAN (Evolved UMTS (Universal Mobile Telecommunications System) Terrestrial Radio Access Network) initial attachment;

a packet data network gateway-initiated bearer modification with a bearer quality of service (QoS) update;

a packet data network gateway-initiated bearer modification without a bearer QoS update;

a user agent-requested packet data network connectivity; and a home subscriber server-initiated subscribed QoS modification.

27. A user agent, comprising:

a processor configured to receive a downlink access point name aggregated maximum bit rate (DL APN-AMBR) and an uplink access point name aggregated maximum bit rate (UL APN-AMBR) associated with an access point name from a network component, wherein the user agent maintains information related to at least one of the DL APN-AMBR and UL APN-AMBR associated with the access point name as part of the user agent's context information.

28. The user agent of claim 27, wherein the user agent provides additional information related to at least one of the DL APN-AMBR and UL APN-AMBR associated with the access point name to a packet data network.

29. The user agent of claim 28, wherein the packet data network is configured to use the additional information related to at least one of the DL APN-AMBR and UL APN-AMBR associated with the access point name to determine at least one transport protocol parameter;

wherein the additional information related to the DL APN-AMBR associated with the access point name comprises one of: the DL APN-AMBR, or a receiver window size calculated using the DL APN-AMBR; and wherein the additional information related to the UL APN-AMBR associated with the access point name comprises the UL APN-AMBR.

30. The user agent of claim 29, wherein, when the additional information related to the DL APN-AMBR associated with the access point name is the DL APN-AMBR, the user agent provides the DL APN-AMBR to a layer in the packet data network above a transport layer in the packet data network, the layer above the transport layer provides the DL APN-AMBR to the transport layer, and the transport layer uses the DL APN-AMBR to calculate the at least one transport protocol parameter.

31. The user agent of claim 30, wherein the layer above the transport layer is an application layer.

32. The user agent of claim 30, wherein the at least one transport protocol parameter is at least one of:

an initial slow start threshold determined by calculating a product of the DL APN-AMBR and a round trip time of a packet sent from the packet data network to the user agent, dividing the product by a scaled value of an average packet size, and setting the initial slow start threshold equal to the result of the division; and a congestion window size determined by calculating the product of the DL APN-AMBR and the round trip time of the packet sent from the packet data network to the user agent, dividing the product by a scaled value of the average packet size, and setting the congestion window size less than or equal to the result of the division.

33. The user agent of claim 29, wherein the user agent provides the UL APN-AMBR to a layer in the packet data network above a transport layer in the packet data network, the layer above the transport layer provides the UL APN-AMBR to the transport layer, and the transport layer uses the UL APN-AMBR to calculate the at least one transport protocol parameter.

34. The user agent of claim 29, wherein, when the additional information related to the DL APN-AMBR associated with the access point name is the receiver window size determined using the DL APN-AMBR, the user agent calculates the receiver window size by calculating a product of the DL APN-AMBR and a round trip time of a packet sent from the packet data network to the user agent, dividing the product by a scaled value of an average packet size, and setting the receiver window size equal to the result of the division, and wherein the user agent provides the receiver window size to a transport layer in the packet data network, and wherein the transport layer uses the receiver window size to calculate the at least one transport protocol parameter.

35. The user agent of claim 34, wherein the at least one transport protocol parameter is at least one of:

an initial slow start threshold calculated by setting the initial slow start threshold equal to the receiver window size; and a congestion window size calculated by setting the congestion window size less than or equal to the receiver window size.

36. The user agent of claim 27, wherein the DL APN-AMBR and UL APN-AMBR UL APN-AMBR associated with the access point name are conveyed to the user agent upon at least one of:

an E-UTRAN (Evolved UMTS (Universal Mobile Telecommunications System) Terrestrial Radio Access Network) initial attachment;

a packet data network gateway-initiated bearer modification with a bearer quality of service (QoS) update;

a packet data network gateway-initiated bearer modification without a bearer QoS update;

a user agent-requested packet data network connectivity; and a home subscriber server-initiated subscribed QoS modification.

* * * * *

UNITED STATES PATENT AND TRADEMARK OFFICE
CERTIFICATE OF CORRECTION

PATENT NO. : 8,565,242 B2  
APPLICATION NO. : 12/611800  
DATED : October 22, 2013  
INVENTOR(S) : Wei Wu et al.

Page 1 of 1

It is certified that error appears in the above-identified patent and that said Letters Patent is hereby corrected as shown below:

In the Claims

Column 18, Claim 36, Line 35 replace "AMBR and UL APN-AMBR UL APN-AMBR associated" with --AMBR and UL APN-AMBR associated--

Signed and Sealed this
Twenty-fourth Day of February, 2015

Michelle K. Lee
*Deputy Director of the United States Patent and Trademark Office*